(12) United States Patent
Matsubayashi et al.

(10) Patent No.: US 10,060,003 B2
(45) Date of Patent: Aug. 28, 2018

(54) AUSTENITIC STAINLESS STEEL SHEET AND METAL GASKET

(71) Applicant: NISSHIN STEEL CO., LTD., Toyko (JP)

(72) Inventors: Hiroyasu Matsubayashi, Yamaguchi (JP); Sadayuki Nakamura, Hiroshima (JP); Junichi Katsuki, Yamaguchi (JP); Ryoji Hirota, Yamaguchi (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 4 days.

(21) Appl. No.: 15/503,434

(22) PCT Filed: Aug. 10, 2015

(86) PCT No.: PCT/JP2015/072605
§ 371 (c)(1),
(2) Date: Feb. 13, 2017

(87) PCT Pub. No.: WO2016/027709
PCT Pub. Date: Feb. 25, 2016

(65) Prior Publication Data
US 2017/0233845 A1 Aug. 17, 2017

(30) Foreign Application Priority Data
Aug. 19, 2014 (JP) ................. 2014-166523

(51) Int. Cl.
*C22C 38/00* (2006.01)
*C21D 9/40* (2006.01)
(Continued)

(52) U.S. Cl.
CPC .............. *C21D 9/40* (2013.01); *B21B 1/22* (2013.01); *B21D 22/02* (2013.01); *C21D 8/0226* (2013.01);
(Continued)

(58) Field of Classification Search
CPC .......... C21D 9/40; C21D 9/46; C21D 8/0026; C21D 8/0236; B21B 1/22; C22C 38/001;
(Continued)

(56) References Cited

U.S. PATENT DOCUMENTS

2002/0102178 A1* 8/2002 Hiramatsu ............. C21D 6/004
420/46
2004/0121169 A1* 6/2004 Adachi ................ C21D 8/0205
428/465
(Continued)

FOREIGN PATENT DOCUMENTS

JP 4-202643 7/1992
JP 8-134595 5/1996
(Continued)

*Primary Examiner* — Gilbert Y Lee
(74) *Attorney, Agent, or Firm* — Clark & Brody

(57) ABSTRACT

A hot rolled austenitic stainless steel sheet contains 0.030 to 0.300% of C, from 0.30 to 3.20% of Si, from 0.90 to 17.00% of Mn, from 1.00 to 8.00% of Ni, from 14.00 to 19.00% of Cr, from 0.50 to 3.50% of Cu, from 0.045 to 0.250% of N, from 0.0001 to 0.0300% of Al, from 0 to 0.50% of V, from 0 to 0.50% of Nb, from 0 to 0.30% of Ti, and from 0 to 0.010% of B, all in terms of percentage by mass, with the balance of Fe and unavoidable impurities, has a converted average composition of an oxide based inclusion that contains 30% by mass or less of $Al_2O_3$, 60% by mass or less of $SiO_2$, and 15% by mass or more of MnO, and satisfies $MnO^3 - 3SiO_2 + 110$. Anisotropy of workability and fatigue resistance characteristics caused by an oxide based inclusion is decreased.

6 Claims, 2 Drawing Sheets

(51) Int. Cl.

| | |
|---|---|
| *C22C 38/58* | (2006.01) |
| *C22C 38/54* | (2006.01) |
| *C22C 38/50* | (2006.01) |
| *C22C 38/48* | (2006.01) |
| *C22C 38/46* | (2006.01) |
| *C22C 38/42* | (2006.01) |
| *C22C 38/34* | (2006.01) |
| *C22C 38/06* | (2006.01) |
| *C22C 38/04* | (2006.01) |
| *C22C 38/02* | (2006.01) |
| *C21D 9/46* | (2006.01) |
| *C21D 8/02* | (2006.01) |
| *B21B 1/22* | (2006.01) |
| *B21D 22/02* | (2006.01) |
| *F16J 15/08* | (2006.01) |

(52) U.S. Cl.
CPC ............ *C21D 8/0236* (2013.01); *C21D 9/46* (2013.01); *C22C 38/001* (2013.01); *C22C 38/02* (2013.01); *C22C 38/04* (2013.01); *C22C 38/06* (2013.01); *C22C 38/34* (2013.01); *C22C 38/42* (2013.01); *C22C 38/46* (2013.01); *C22C 38/48* (2013.01); *C22C 38/50* (2013.01); *C22C 38/54* (2013.01); *C22C 38/58* (2013.01); *F16J 15/0806* (2013.01); *F16J 15/0818* (2013.01); *B21B 2001/225* (2013.01); *C21D 2211/001* (2013.01)

(58) Field of Classification Search
CPC   C22C 38/02; C22C 38/04; C22C 3/06; C22C 38/34; C22C 38/42; C22C 38/46; C22C 38/48; C22C 38/50; C22C 38/54; C22C 38/58; F16J 15/0806; F16J 15/0818
See application file for complete search history.

(56) References Cited

U.S. PATENT DOCUMENTS

| | | | |
|---|---|---|---|
| 2004/0156737 A1* | 8/2004 | Rakowski | C22C 38/02 420/53 |
| 2006/0034724 A1* | 2/2006 | Hamano | C21D 6/002 420/39 |
| 2008/0047636 A1* | 2/2008 | Sasaki | C21D 6/002 148/559 |
| 2008/0217866 A1* | 9/2008 | Tripathy | F16J 15/0806 277/595 |
| 2011/0139321 A1* | 6/2011 | Murakami | C21D 6/004 148/634 |

FOREIGN PATENT DOCUMENTS

| | | |
|---|---|---|
| JP | 7-150304 | 6/1996 |
| JP | 2000-109957 | 4/2000 |
| JP | 2002-371339 | 12/2002 |
| JP | 2003-082441 | 3/2003 |
| JP | 2011-252208 | 12/2011 |

* cited by examiner

[Fig.1]
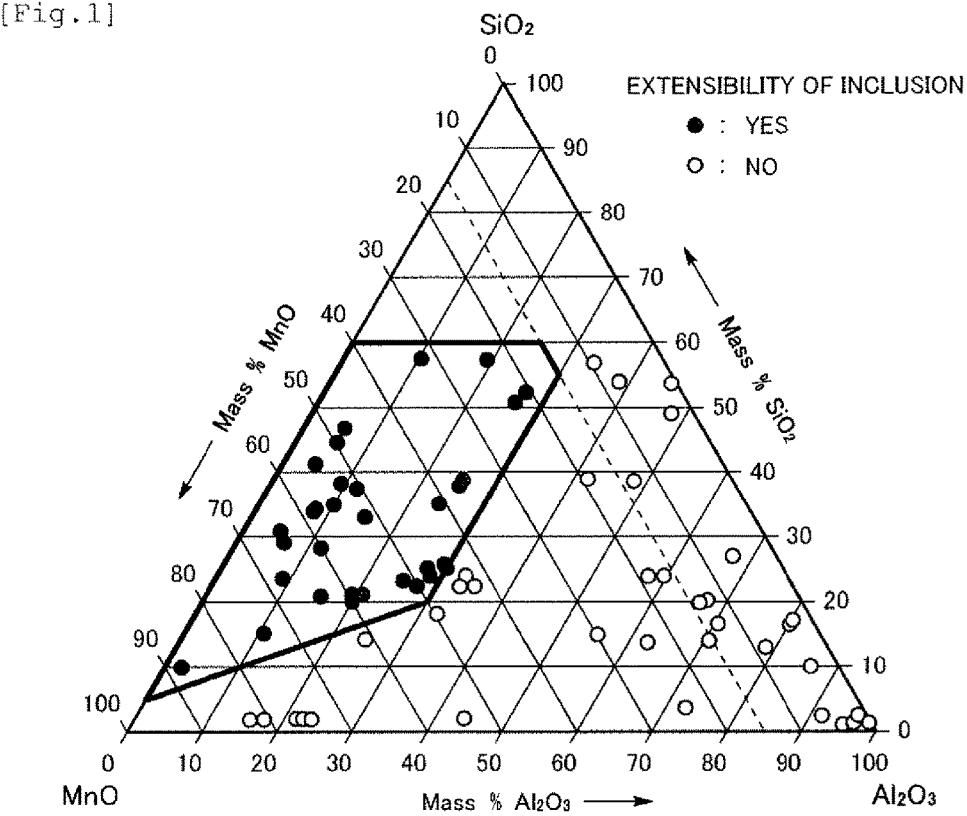
[Fig.2]
(a) COMPARATIVE EXAMPLE
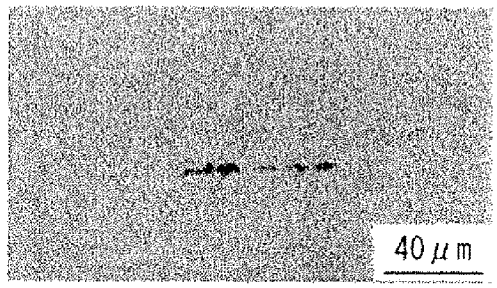
(b) EXAMPLE OF INVENTION
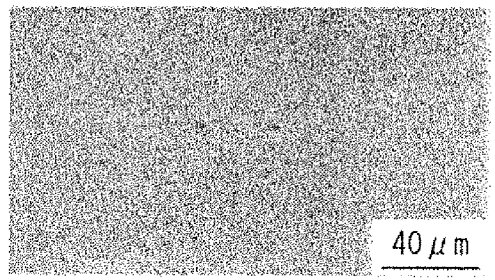

[Fig.3]
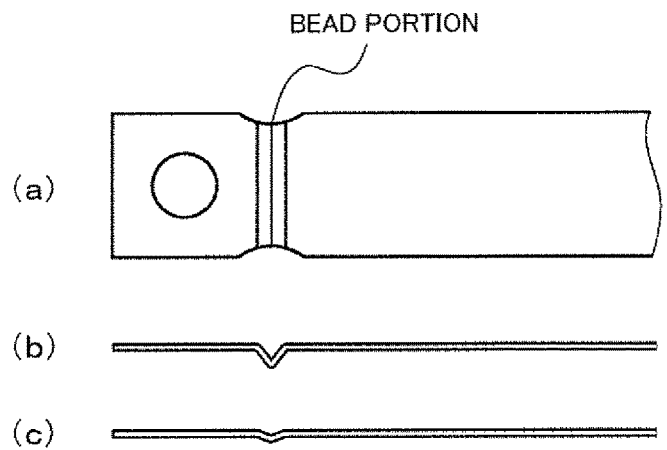
[Fig.4]
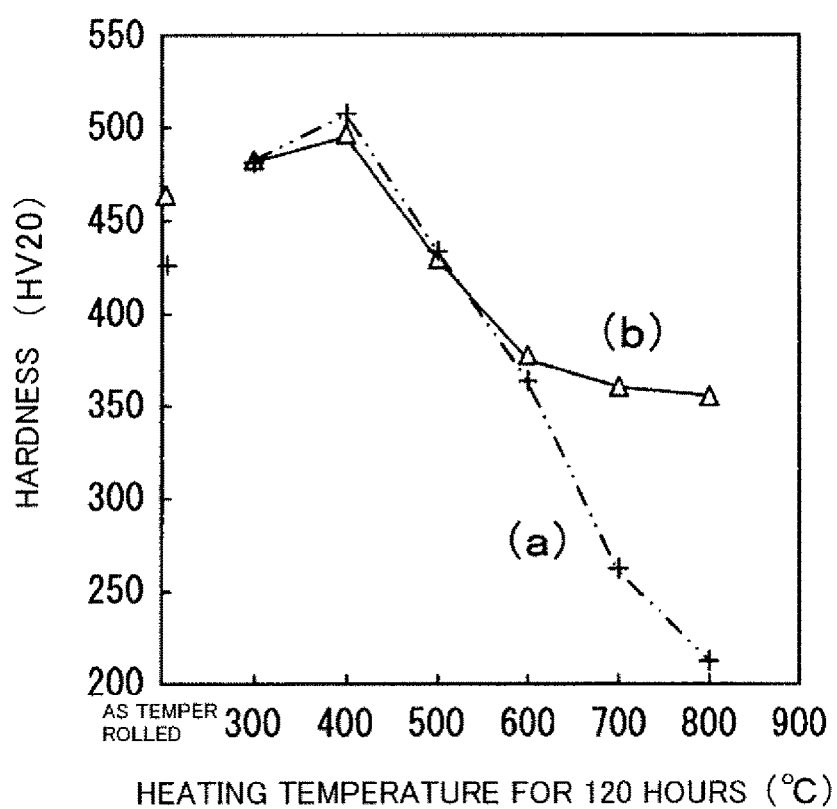

AUSTENITIC STAINLESS STEEL SHEET AND METAL GASKET

TECHNICAL FIELD

The present invention relates to a stainless steel sheet for a metal gasket that is excellent in strength, fatigue characteristics, and high temperature softening resistance characteristics, and a metal gasket using the same.

BACKGROUND ART

Cylinder head gaskets of engines and exhaust manifold gaskets for an automobile, a motorcycle and the like are exposed to repeated pressure fluctuations under a high temperature, a high pressure, and a high vibration that are peculiar to the engines. Among these, the cylinder gasket for an automobile engine receives a high pressure in the compression stroke, and thus is necessarily in contact with both the contact materials with a high contact pressure (surface pressure) for retaining the sealing property. The metal gasket used in an engine or an exhaust gas flow path generally has a bead having a constant height (i.e., a continuous ridge) formed through bead forming by pressing, for ensuring the sufficient contact pressure. The metal gasket of this type is used by pressing the apex of the bead ridge (which is hereinafter referred to as a bead apex) onto a contact material for ensuring the high sealing property, and therefore necessarily has a high strength and high fatigue characteristics in use.

A work-hardening metastable austenitic stainless steel (such as SUS301 series) has been often used in the gasket applied to an automobile engine and an exhaust gas flow path thereof. The steel of this type achieves a high strength through formation of deformation induced martensite by cold rolling. However, the cold rolling reduction ratio is necessarily increased for enhancing the strength level. The increase of the cold rolling reduction ratio may be a factor decreasing the toughness, the fatigue resistance characteristics, and the workability. PTLs 1 and 2 describe metastable austenitic stainless steels that are improved in these characteristics. There has been a martensitic stainless steel as a material having a strength that is enhanced without the increase of the cold rolling reduction ratio. PTL 3 describes the application of a martensitic steel types to a gasket.

CITATION LIST

Patent Literatures

PTL 1: JP-A-2003-82441
PTL 2: JP-A-2011-252208
PTL 3: JP-A-2000-109957

SUMMARY OF INVENTION

Technical Problem

The metastable austenitic stainless steel is to have an increased strength through cold rolling as described above. The increase of the cold rolling reduction ratio for enhancing the strength level causes anisotropy in the bending workability and the fatigue characteristics between the direction in parallel to rolling direction (L direction) and the direction perpendicular to rolling direction (C direction) of the sheet material. In the use as a metal gasket, the anisotropy may become a factor impairing the retention of the uniform contact surface pressure between the bead apex and the contact material, and thus may become a factor deteriorating the performance of the metal gasket. On the other hand, the martensitic stainless steel is not necessarily subjected to work hardening by applying a high cold rolling reduction ratio, and thus inherently may not involve the anisotropy associated with work hardening.

However, according to the researches by the present inventors, it has been found that a metal gasket formed through bead forming with the austenitic stainless steel sheet or the martensitic stainless steel sheet may involve the problem of performance deterioration, which is considered to be caused by the anisotropy of the material, in the evaluation under severe test conditions. It has been considered that the major factor thereof is the reduction of the workability and the fatigue resistance characteristics in the particular direction caused by a coarse oxide based inclusion present in a successive form in the rolling direction in the material (steel sheet).

The invention is to describe a technique for reducing the "anisotropy" of the workability and the fatigue resistance characteristics caused by an oxide based inclusion in an austenitic stainless steel sheet. Simultaneously, the invention is to describe a measure for imparting the "high temperature softening resistance characteristics" capable of retaining high durability in the purpose of a metal gasket used under a high temperature, and preventing the "hot rolling cracking" in hot rolling.

Solution to Problem

It has been found that the reduction of the "anisotropy" can be achieved by softening the oxide based inclusion present in the steel sheet. The chemical composition that does not excessively form the deformation induced martensite phase is also effective for the reduction of the anisotropy and the retention of the workability. It has been found that for enhancing the "high temperature softening resistance characteristics", the use of such a composition is important that the dislocation anchoring effect of the interstitial solid solution elements (C and N) bearing the strain aging is difficult to release, and therefor, such a measure is effective that the Mn content is increased, and the N content is sufficiently ensured. Furthermore, for preventing the "hot rolling cracking", it is effective to optimize the formation amount of the δ ferrite phase.

The invention thus provides a hot rolled austenitic stainless steel sheet having a steel composition that contains from 0.030 to 0.300% of C, from 0.30 to 3.20% of Si, from 0.90 to 17.00% of Mn, from 1.00 to 8.00% of Ni, from 14.00 to 19.00% of Cr, from 0.50 to 3.50% of Cu, from 0.045 to 0.250% of N, from 0.0001 to 0.0300% of Al, from 0 to 0.50% of V, from 0 to 0.50% of Nb, from 0 to 0.30% of Ti, and from 0 to 0.010% of B, all in terms of percentage by mass, with the balance of Fe and unavoidable impurities, and has an $Md_{30}$ value defined by the following expression (1) of 50.0 or less and a $\delta_{1230}$ value defined by the following expression (2) of 8.0 or less, and having an average composition of an oxide based inclusion observed in a metal structure that contains 30% by mass or less of $Al_2O_3$, 60% by mass or less of $SiO_2$, and 15% by mass or more of MnO, in terms of converted mass ratio of $Al_2O_3$, $SiO_2$, and MnO, and satisfies the following expression (3):

$$Md_{30}=551-462(C+N)-9.2Si-8.1Mn-29(Ni+Cu)-13.7Cr \quad (1)$$

$$\delta_{1230}=-101.5-78.6C+3.1Si+0.4Mn-2.4Ni+7.7Cr-1.5Cu-51.4N \quad (2)$$

$$MnO \geq -3SiO_2+110 \quad (3)$$

wherein in the expressions (1) and (2), the element symbols represent the percentages by mass of the elements respectively in the steel composition, and in the expression (3), MnO and $SiO_2$ represent the converted percentages by mass of MnO and $SiO_2$ respectively in the average composition of the oxide based inclusion.

In the steel component elements, V, Nb, Ti, and B are elements that are arbitrarily added. The content of Al in the steel component elements is the total Al content. The "converted mass ratio of $Al_2O_3$, $SiO_2$, and MnO" means that the contents of Al, Si, and Mn in the oxide based inclusion are converted to the mass ratios of the single oxide, i.e., $Al_2O_3$, $SiO_2$, and MnO, respectively.

Examples of the steel sheet that is suitable as a material to be worked to a metal gasket include a cold rolled austenitic stainless steel sheet derived from the aforementioned hot rolled steel sheet. The cold rolled austenitic stainless steel sheet has a Vickers hardness on the surface of the sheet (rolled surface) that is adjusted, for example, to from 400 to 500 HV. The thickness thereof may be, for example, from 0.05 to 0.5 mm, and may also be managed to from 0.1 to 0.3 mm.

The invention also provides a metal gasket containing the aforementioned cold rolled steel sheet having been formed, having a bead formed by press forming, and being used by pressing an apex of the bead onto a contact material. After forming the bead, an aging treatment may be performed at from 100 to 500° C. depending on necessity. The "apex of the bead" means the apex of the convex part of the bead that is in contact with the contact material.

Advantageous Effects of Invention

According to the invention, the oxide based inclusion present in the material has a decreased melting point and is softened, and therefore the oxide based inclusion is extended in the rolling direction following the deformation of the steel base material (matrix) in the hot rolling and the subsequent cold rolling, and is prevented from remaining in the form of coarse particles in the cold rolled steel sheet having a reduced thickness. Accordingly, the deterioration of the workability and the fatigue resistance characteristics due to the oxide based inclusion as the starting point can be considerably improved. Conventionally, the oxide based inclusion has been distributed by hot rolling in the form of coarse particles that are divided in a certain extent but are close to each other in the rolling direction, and thus the bending workability with a ridge line in the rolling direction and the fatigue resistance characteristics are deteriorated, which become a factor forming anisotropy of the workability and the fatigue resistance characteristics. In the cold rolled steel sheet according to the invention, the anisotropy is relieved to provide a gasket with high dimensional accuracy after forming a bead. Furthermore, in the use of the gasket, the contact surface pressure applied to the bead apex is retained uniform due to the small anisotropy of the fatigue resistance characteristics. Consequently, a metal gasket excellent in leakage resistance can be achieved. Moreover, the cold rolled steel sheet of the invention is excellent in high temperature softening resistance characteristics, and thus is considerably useful for the purpose of a metal gasket used under a high temperature.

BRIEF DESCRIPTION OF DRAWINGS

FIG. 1 is a diagram showing the relationship between the composition of the $Al_2O_3$—$SiO_2$—MnO ternary oxide and the extensibility of the oxide based inclusion.

FIG. 2 is the optical micrographs of the oxide based inclusion observed on the L cross section.

FIG. 3 is a schematic illustration showing the shape of the vicinity of the bead of the fatigue test piece.

FIG. 4 is a graph exemplifying the relationship between the heating temperature and the hardness of the material having been subjected to a heating test for 120 hours after the temper rolling.

DESCRIPTION OF EMBODIMENTS

Oxide Based Inclusion

The inclusions present in steel are roughly classified into a highly extensible type and a difficultly deformable type. The former is mainly a sulfide based one, and the later is mainly an oxide based one. Among these, an oxide based inclusion of a difficultly deformable type is difficult to extend in cold rolling, and remains as coarse particles in the steel. The coarse oxide based inclusion particles become a factor deteriorating the workability and the fatigue resistance characteristics. In the steel making process, refining and casting are generally performed with the intention to reduce the amount of the inclusion (i.e., high cleanliness) and to reduce the diameter thereof. However, the excessively high cleanliness increases the load in the steel making process, which leads increase of the product cost. Accordingly, the invention employs a measure of decreasing the melting point of the oxide based inclusion and softening the oxide based inclusion as much as possible, as a technique that can be performed in the manufacture of an austenitic stainless steel having an ordinary cleanliness level.

It is considered that the oxide based inclusion is actually a composite oxide containing Al, Si, and Mn as major components. According to the detailed investigations by the inventors, it has been found that the compositional range of the oxide based inclusion that is effective for imparting extensibility to the inclusion can be identified in the case where the contents of Al, Si, and Mn in the oxide based inclusion are shown by the composition converted to the single oxide, i.e., $Al_2O_3$, $SiO_2$, and MnO. In the equilibrium diagram of the $Al_2O_3$—$SiO_2$—MnO ternary oxide, the compositional range approximately agrees with the range where the oxide has a relatively low melting point.

FIG. 1 shows the relationship between the composition of the $Al_2O_3$—$SiO_2$—MnO ternary oxide and the extensibility of the oxide based inclusion. The plots in the diagram show the results of evaluation of the extension state of the oxide based inclusion on a cross section in parallel to the rolling direction and the thickness direction (i.e., the L cross section) of a cold rolled steel under the certain standard for many stainless steels. Specifically, the case where the respective oxide based inclusion particles are collapsed and clearly extended in the rolling direction by cold rolling is shown by the solid dot (extensibility: yes). The coordinates of the plots each show the "average composition of the oxide based inclusion" obtained by converting the contents of Al, Si, and Mn of the oxide based inclusion to the mass ratios of $Al_2O_3$, $SiO_2$, and MnO respectively. In the region where the converted average composition contains 30% by mass or less of $Al_2O_3$, 60% by mass or less of $SiO_2$, and 15% by mass or more of MnO and satisfies the following expression (3) (which is shown by the bold frame in FIG. 1), the oxide based inclusion has extensibility.

$$MnO \geq -3SiO_2 + 110 \quad (3)$$

As described in the examples later, in the case where the composition of the oxide based inclusion is in the range, the anisotropy of the bending workability and the fatigue resistance characteristics is considerably improved, so as to provide a base material steel sheet suitable for a metal gasket demanded to have a high performance.

The composition of the oxide based inclusion can be controlled mainly by the steel composition and the steel making condition. Particularly, in the steel composition, it is effective to ensure the Mn content sufficiently and to restrict the Al content. In addition to these, it is considerably effective to perform Si deoxidizing rather than Al deoxidizing in the steel making.

FIG. 2 exemplifies the optical micrographs of the oxide based inclusion observed on a L cross section of a hot rolled and annealed steel sheet having been subjected to cold rolling with a rolling reduction of 40% to a thickness of 0.8 mm. FIG. 2(a) shows the comparative example No. 22, and FIG. 2(b) shows the example of the invention No. 1 described later. In general, an oxide based inclusion found in an austenitic stainless steel sheet is hard and is present in the steel sheet without significant collapse even after cold rolling, as shown in FIG. 2(a). With a smaller thickness, the proportion of the diameters of the inclusion particles occupied in the thickness becomes larger, which is liable to be a factor impairing the workability and the fatigue resistance characteristics. In the austenitic stainless steel sheet according to the invention, on the other hand, the composition of the oxide based inclusion is controlled to the range providing softness, and thus is collapsed by rolling and extended in the rolling direction following the metal flow of the steel base material, as shown in FIG. 2(b). The extension degree of the oxide based inclusion is increased with the decrease of the thickness, and the adverse influence thereof on the bending workability and the fatigue resistance characteristics becomes considerably small. In the purpose of a metal gasket subjected to bead press forming, the maximum diameter of the oxide based inclusion in the thickness direction observed on the L cross section of the steel sheet to be subjected to forming is preferably 5.0 µm or less, and more preferably 3.0 µm or less. The maximum diameter in the thickness direction thereof is more effectively extended to 1.0% or less of the thickness.

Steel Composition

The chemical composition of the steel sheet targeted in the invention (steel composition) will be described below. In the following description, the "percentage" in the steel composition means "percentage by mass" unless otherwise indicated.

C is an element forming austenite, and is an element that is effective for strengthening the austenite phase and the deformation induced martensite phase. When the C content is too small, the aforementioned strengthening effect may not be sufficiently exhibited. As a result of various investigations, the C content is necessarily 0.030% or more, and more preferably 0.060% or more. The C content may be managed to a value exceeding 0.100%. However, too large a C content is liable to cause the grain boundary precipitation of a Cr carbide in the cooling process, and may be a factor deteriorating the corrosion resistance. The C content is controlled to a range of 0.300% or less.

Si is added as a deoxidizing agent in steel making. According to the investigations by the inventors, deoxidizing with Si is considerably effective for controlling the composition of the oxide based inclusion to the range providing softness. Si is necessarily added to make a Si content of 0.30% or more. Si has a large function of hardening the austenite phase and the deformation induced martensite phase, and the hardening effect is effective for enhancing the strength of the gasket. However, the excessive increase of the hardness may be a factor deteriorating the workability and the toughness. The Si content is restricted to a range of 3.20% or less, and may be managed to 3.00% or less.

Mn is an element forming austenite, and is an element that is important for softening the oxide based inclusion. It has been found that in the case where the Mn content is increased, the enhancement effect of the high temperature softening resistance characteristics can be obtained by sufficiently ensuring the N content. It is supposed that this is an effect caused by the fact that in the case where the Mn content is large, the retention of the function of anchoring the dislocation by N, among C and N that are accumulated in the end portion of the edge dislocation (i.e., the edge portion) due to heating after the cold working, is facilitated to a high temperature. That is, it is considered that the structure state of the "strain aged" is prevented from being broken even under heating to a high temperature, by the composite function of Mn and N. This is also confirmed by the fact that in the examples described later, the comparative example No. 22 (with a low Mn content and a high N content) exhibits deteriorated high temperature softening resistance characteristics, but the examples of the invention (with a Mn content and a N content that are sufficiently high) are improved in high temperature softening resistance characteristics.

As a result of detailed investigations by the inventors, for achieving a gasket with high performance by sufficiently relieving the anisotropy of the workability and the fatigue resistance characteristics, it is considerably effective to ensure a Mn content of 0.90% or more. When the Mn content is lower than that value, the composition of the oxide based inclusion is difficult to control to the aforementioned predetermined range, thereby failing to provide stably a gasket having small anisotropy. This is also disadvantageous for enhancing the high temperature softening resistance characteristics. The Mn content may be managed to a range exceeding 1.00%. However, when the Mn content is increased, the load on the steel making is increased, and shortage in corrosion resistance may occur depending on the purpose. As a result of various investigations, the Mn content is allowed to be 17.00% at most, is preferably 8.00% or less, and may be managed to a range of 5.00% or less.

Ni is an element forming austenite, and in the invention, the N content is 1.00% or more. When the Ni content is smaller than that value, it is difficult to control the components for providing an austenite single phase structure in the state after annealing. In the invention, Mn is contained as described above, and therefore the Ni content can be saved thereby. The Ni content may be set in a range of 8.00% or less.

Cr is an element that is essential for imparting the corrosion resistance necessary as a stainless steel. In the purpose of a metal gasket, a Cr content of 14.00% or more is desirably ensured. However, Cr is an element forming ferrite, and therefore when the Cr content is increased, the amount of the austenite forming element that is required for forming an austenite single phase structure after annealing is also increased, which may be a factor increasing the steel material cost. As a result of various investigations, the Cr content is preferably in a range of 19.00% or less.

Cu is an element forming austenite, and is considered to be effective for enhancing the high temperature softening resistance characteristics, as similar to Mn. In the invention, a steel having a Cu content of 0.50% or more is targeted. However, when the amounts of Mn and Cu are simultaneously increased, a Cu—Mn phase is liable to be deposited on heating before hot rolling, which may be a factor causing cracks in hot rolling. For preventing hot cracking, it is effective to restrict the $\delta_{1230}$ value of the expression (2) to the certain value, as described later, and in addition to this, the Cu content is necessarily restricted to 3.50% or less.

N is an element forming austenite, and is effective for strengthening the austenite phase and the deformation induced martensite phase, as similar to C. Furthermore, the addition of N is important for sufficiently providing the effect of enhancing the high temperature softening resistance characteristics, which are considered to be a composite effect with Mn as described above. As a result of various investigations, the N content is 0.045% or more. When the content is less than that value, it is difficult to enhance stably the high temperature softening resistance characteristics. The N content of 0.085% or more is more effective. The excessive N content forms a nitride in the cooling process after annealing to be a factor deteriorating the corrosion resistance and the fatigue resistance characteristics. The N content is restricted to 0.250% or less.

Al is an element having a strong deoxidizing function. However, according to the investigations by the inventors, it has been found that the composition of the oxide based inclusion can be easily controlled to the aforementioned range by using Si deoxidizing mainly, rather than the deoxidizing only with Al, and by refining such that Al is added to make a total Al content in the steel of 0.0001% or more. There may be a case where the toughness is adversely affected by the increase of the Al content. The total Al content in the steel is restricted to 0.0300% or less.

V, Nb, Ti, and B are elements effective for improving the productivity, the strength, the fatigue resistance characteristics, and the like. One or more of these elements may be added depending on necessity. The contents thereof are 0.50% or less for V, 0.50% or less for Nb, 0.30% or less for Ti, and 0.020% or less for B. The more effective contents thereof are from 0.01 to 0.50% for V, from 0.01 to 0.50% for Nb, from 0.01 to 0.30% for Ti, and from 0.0005 to 0.020% for B.

The contents of the elements are controlled to make the $Md_{30}$ value defined by the following expression (1) of 50.0 or less.

$$Md_{30}=551-462(C+N)-9.2Si-8.1Mn-29(Ni+Cu)-13.7Cr \quad (1)$$

In the expression (1), the element symbols represent the percentages by mass of the elements respectively. The $Md_{30}$ value is an index of the stability of austenite that is defined as the temperature (° C.), at which on applying a tensile strain of 30% to an austenite single phase, 50% of the structure is transformed to martensite. In the invention, the contents of the component elements are balanced to make the $Md_{30}$ value of 50.0 or less, and the deformation induced martensite phase is prevented from being induced excessively.

The contents of the elements are controlled to make the $\delta_{1230}$ value defined by the following expression (2) of 8.0 or less.

$$\delta_{1230}=-101.5-78.6C+3.1Si+0.4Mn-2.4Ni+7.7Cr-1.5Cu-51.4N \quad (2)$$

In the expression (2), the element symbols represent the percentages by mass of the elements respectively. The $\delta_{1230}$ value is an index showing the amount (% by volume) of the δ ferrite phase in the center portion of a cross section the cast slab obtained by continuous casting, after heating to 1,230° C. for 120 minutes. According to the investigations by the inventors, when the Mn content and the Cu content in the austenitic stainless steel are simultaneously increased, a Cu—Mn phase is liable to precipitate on heating the cast slab before hot rolling, which may be a factor causing cracks on hot rolling. The influence on the hot rolling cracking of the Cu—Mn phase has a relationship to the amount of the δ ferrite phase present, and in a steel types having a total content of Mn and Cu of 1.4% by mass or more as in the steel targeted in the invention, the hot rolling cracking can be significantly prevented by controlling the $\delta_{1230}$ value to 8.0 or less.

The $\delta_{1230}$ value is an index for providing the stable prevention method of the hot rolling cracking of an austenitic steel types having a total content of Mn and Cu of 1.4% by mass or more, to which the ordinary hot rolling condition of an austenitic stainless steel (heating temperature of cast material: 1,100 to 1,350° C.) has been applied, but does not mean that the heating temperature of the cast material before hot rolling should be 1,230° C.

Production Method

A representative production method will be described below. A steel having been controlled to have the aforementioned chemical composition is manufactured with an ordinary steel making equipment for a stainless steel to provide a cast slab. There is no necessity of a special process for providing high cleanliness. However, the deoxidizing method is desirably Si deoxidizing rather than deoxidizing only with Al. It is more effective to add Al in combination. The cast slab is subjected to hot rolling in the similar manner as the production of an ordinary austenitic stainless steel sheet, so as to provide a hot rolled steel sheet. The heating temperature for the cast slab before the hot rolling may be in a range of from 1,100 to 1,350° C. The oxide based inclusion present in the hot rolled steel sheet has a composition within the aforementioned range and thus is softened.

The hot rolled steel sheet is subjected to annealing, and then subjected to cold rolling to reduce the thickness. Intermediate annealing may be performed depending on necessity in the course of the cold rolling. The oxide based inclusion having been softened is collapsed under the pressure of the cold rolling, and is extended in the rolling direction following the metal flow of the steel base material. After performing finish annealing, temper rolling may be performed to provide the thickness of the final product. The thickness may be, for example, from 0.05 to 0.5 mm. According to the procedures, the cold rolled steel sheet derived from the aforementioned hot rolled steel sheet can be obtained. In the aforementioned processes, pickling is generally performed after the annealing.

The resulting cold rolled steel sheet is free of the anisotropy problem in the ordinary materials caused by the coarse oxide based inclusion present in a successive form in the rolling direction, and is suitable for various press forming purposes including a metal gasket. In the process of producing a metal gasket, a bead having a constant height is formed by bead press forming. The press formed material thus obtained may be subjected to an aging treatment at from 100 to 500° C. depending on necessity. The aging treatment provides the aforementioned effect of "strain aging", thereby increasing the strength of the material. Even in the case where an aging treatment is not performed, a metal gasket is heated to a high temperature during the use thereof, thereby providing the effect of strain aging. The metal gasket according to the invention is improved in high temperature softening resistance characteristics as described above, and thus is prevented from decreasing in strength in a high temperature purpose, thereby providing excellent durability in combination with the effect of decreasing the anisotropy of the fatigue resistance characteristics.

Example

Steels having the chemical compositions shown in Table 1 were manufactured, and cast slabs were obtained therefrom. The deoxidizing performed was Si deoxidizing for all the steels targeted in the invention. The cast slab was heated to from 1,100 to 1,350° C. for 120 minutes, then taken out from the furnace, and subjected to hot rolling to provide a hot rolled steel sheet having a thickness of 3.0 mm.

performed once or multiple times, and then temper rolling was performed at a temper rolling reduction ratio making a hardness on the sheet surface (rolled surface) of from 430 to 460 HV at a final thickness of 0.2 mm, thereby providing a cold rolled steel sheet having a thickness of 0.2 mm. The resulting cold rolled steel sheet having been finished by temper rolling was subjected to the following tests as a test material.

Hardness

The Vickers hardness of the sheet surface (rolled surface) of the test material was measured.

Bending Workability

A test material of the cold rolled steel sheet having been finished by temper rolling was subjected to a bending test by the V block method of JIS Z2248:2006. The test piece having the longitudinal direction that is in parallel to the rolling direction is designated as the L direction, and that having the longitudinal direction that is perpendicular to the rolling direction is designated as the C direction. In the bending test piece of the L direction, the bending ridge line is perpendicular to the rolling direction, and in the bending test piece of the C direction, the bending ridge line is in parallel to the rolling direction. The ratio of the minimum

TABLE 1

| Class | Steel | Chemical composition (% by mass) | | | | | | | | $Md_{30}$ | $\delta_{1230}$ |
| --- | --- | --- | --- | --- | --- | --- | --- | --- | --- | --- | --- |
| | | C | Si | Mn | Ni | Cr | N | Cu | Al | Others | | |
| Steel of invention | A | 0.120 | 0.50 | 2.70 | 2.70 | 16.00 | 0.120 | 2.70 | 0.002 | — | 37.85 | −1.80 |
| | B | 0.160 | 0.50 | 4.80 | 1.50 | 16.00 | 0.120 | 2.70 | 0.002 | — | 37.16 | −1.22 |
| | C | 0.083 | 3.16 | 1.51 | 5.40 | 14.90 | 0.098 | 2.05 | 0.004 | — | 5.89 | −3.97 |
| | D | 0.086 | 2.67 | 1.52 | 5.41 | 15.08 | 0.098 | 2.05 | 0.003 | — | 6.18 | −4.35 |
| | E | 0.084 | 2.16 | 1.97 | 5.42 | 14.96 | 0.095 | 2.05 | 0.002 | — | 10.89 | −6.39 |
| | F | 0.020 | 1.00 | 2.00 | 6.50 | 17.00 | 0.095 | 2.50 | 0.002 | — | −21.43 | 7.50 |
| | G | 0.120 | 1.00 | 1.00 | 6.00 | 16.00 | 0.050 | 0.50 | 0.002 | — | 47.46 | −1.95 |
| | H | 0.060 | 0.50 | 1.50 | 7.50 | 18.00 | 0.080 | 3.50 | 0.002 | — | −96.03 | 7.17 |
| | I | 0.130 | 0.50 | 16.80 | 1.50 | 16.50 | 0.200 | 1.50 | 0.002 | — | −55.19 | 7.47 |
| | J | 0.162 | 0.52 | 2.99 | 1.52 | 15.99 | 0.199 | 2.72 | 0.003 | V: 0.48 | 13.19 | −6.26 |
| | K | 0.160 | 0.51 | 2.98 | 1.52 | 16.02 | 0.198 | 2.70 | 0.003 | Nb: 0.45 | 14.92 | −5.82 |
| | L | 0.161 | 0.50 | 3.00 | 1.55 | 16.00 | 0.120 | 2.73 | 0.002 | Ti: 0.29 | 48.96 | −2.19 |
| | M | 0.160 | 0.50 | 3.01 | 1.54 | 16.00 | 0.122 | 2.71 | 0.002 | B: 0.01 | 49.29 | −2.15 |
| Comparative steel | N | 0.086 | 3.58 | 1.05 | 5.64 | 15.14 | 0.096 | 2.07 | 0.004 | — | −5.53 | −1.74 |
| | O | 0.080 | 2.73 | 0.28 | 6.05 | 14.96 | 0.090 | 2.00 | 0.001 | — | 6.67 | −6.17 |
| | P | 0.109 | 0.49 | 1.09 | 7.36 | 17.16 | <u>0.011</u> | 0.24 | 0.005 | — | 26.73 | 5.43 |
| | Q | 0.100 | 0.60 | <u>0.80</u> | 6.28 | 16.50 | <u>0.040</u> | 0.20 | 0.005 | — | <u>60.35</u> | 2.44 |
| | R | <u>0.020</u> | 0.50 | 1.20 | 7.18 | 17.50 | 0.110 | 0.20 | 0.005 | — | 22.85 | <u>10.52</u> |
| | S | 0.060 | 0.50 | 3.30 | 3.50 | 18.00 | 0.050 | 3.20 | 0.002 | — | 26.33 | <u>19.56</u> | underlined value: outside the scope of the invention

Compositional Analysis of Oxide Based Inclusion

A specimen cut out from the hot rolled steel sheet was observed with SEM on a cross section in parallel to the rolling direction and the thickness direction (i.e., the L cross section), and 30 particles were arbitrarily selected from the particles of the oxide based inclusion present on the L cross section, and were subjected to compositional analysis by EDX (energy dispersive X-ray spectrometry). The contents of Al, Si, and Mn of the respective inclusions were converted to the mass ratios of the single oxide, i.e., $Al_2O_3$, $SiO_2$, and MnO, respectively, and the values of the mass ratios were averaged for the 30 oxide based inclusion particles to provide the average composition of the oxide based inclusion of the steel sheet.

Subsequently, the hot rolled steel sheet was subjected to a heat treatment by soaking at 1,100° C. for 60 seconds, and then subjected to cold rolling to reduce the thickness. In the course of the cold rolling, intermediate annealing by soaking within a range of from 900 to 1,100° C. for 60 seconds was bending radius R that does not form a defect including cracking on the outer surface of the bent portion to the thickness t is designated as the bending limit (R/t). The bending test was performed for three test pieces (n=3), and the worst result among the three test results was adopted as the result of the test. A material that has a bending limit R/t of 1.5 or less in both the L direction and the C direction, and a ratio of (bending limit R/t in C direction)/(bending limit R/t in L direction) of 1.3 or less can be evaluated to have good bending workability for a steel sheet material for a metal gasket, subjected to bead press forming.

Fatigue Resistance Characteristics

Strip specimens (width: 8 mm) respectively having the longitudinal directions of the L direction and the C direction were collected from the test material, and each were worked to a test piece having an "initial bead" having the shape shown in FIGS. 3(a) and 3(b) by bead press forming. The initial bead had a groove width of approximately 3 mm and an initial bead height of approximately 0.4 mm. The initial bead portion was subjected to compression corresponding to the initial tightening of a metal gasket, thereby producing a fatigue test specimen having a simulated bead having a remaining bead height of approximately 0.1 mm as shown in FIG. 3(c). In the cross sectional shape schematically shown in FIGS. 3(b) and 3(c), the dimension in the thickness direction is drawn with exaggeration. The fatigue test piece was subjected to a fatigue test by applying a reversed stress to the simulated bead portion, and the fatigue limit (N/mm$^2$) at a number of cycles of 107 was obtained. A material that has a fatigue limit of 300 N/mm$^2$ or more in both the L direction and the C direction, and a difference in fatigue limit between the L direction and the C direction of 30 N/mm$^2$ or less can be evaluated to have good fatigue resistance characteristics for a metal gasket having a formed bead press portion.

High Temperature Softening Resistance Characteristics

The test materials untouched after the temper rolling were subjected to a heat treatment of retaining at temperatures in a range of from 300 to 800° C. with a step of 100° C. for 120 hours, and the hardness of the surface of the sheet (rolled surface) after the heat treatment was measured. FIG. 4 exemplifies the measurement results of a part of the test materials. In FIG. 4, (a) shows the comparative example No. 23, and (b) shows the example of the invention No. 1 (the numbers are those in Table 2). Under the condition of a heating time of 120 hours, the increase of the hardness due to the strain aging was found at heating temperatures of 300° C. and 400° C. in both the materials. When the heating temperature is increased, the material is softened. In the comparison of the softening behavior in a high temperature range of 600° C., the example of the invention No. 1 was considerably suppressed in softening and maintained a hardness around 350 HV after heating at 800° C. for 120 hours, and thus it was found that the high temperature softening resistance characteristics were considerably improved. In the heating test, when the heating temperature that lowers the hardness to ⅔ of the hardness $H_0$ (HV) of the material after the temper rolling, i.e., the heating temperature that provides a hardness of ⅔·$H_0$, is 800° C. or more, it can be determined that the material has excellent high temperature softening resistance characteristics as a metal gasket formed through bead forming. Accordingly, the high temperature softening resistance characteristics herein were evaluated by the temperature that provides ⅔·$H_0$.

The results are shown in Table 2. In Table 2, the "finish annealing" means the final annealing performed before the temper rolling.

TABLE 2

| Class | No. | Steel | Presence of cracking on hot rolling | Composition of oxide based inclusion (% by mass) | | | Finish annealing temperature (° C.) | Hardness after finish annealing (HV) | Hardness after temper rolling $H_0$ (HV) | High temperature softening resistance characteristics Heating temperature for 120 h providing ⅔·$H_0$ (° C.) | Anisotropy Bending limit R/t | | Fatigue limit (N/mm$^2$) | | |
|---|---|---|---|---|---|---|---|---|---|---|---|---|---|---|---|
| | | | | $Al_2O_3$ | $SiO_2$ | MnO | | | | | L Direction | C Direction | L Direction a | C Direction b | Difference \|a − b\| |
| Example of invention | 1 | A | no | 5 | 47 | 48 | 1050 | 185 | 460 | ≥800 | 1.0 | 1.1 | 380 | 350 | 30 |
| | 2 | A | no | 5 | 47 | 48 | 900 | 210 | 450 | ≥800 | 1.0 | 1.1 | 390 | 360 | 30 |
| | 3 | A | no | 5 | 47 | 48 | 1050 | 185 | 460 | ≥800 | 1.0 | 1.2 | 390 | 360 | 30 |
| | 4 | B | no | 10 | 35 | 55 | 1050 | 182 | 450 | ≥800 | 1.0 | 1.2 | 380 | 350 | 30 |
| | 5 | C | no | 28 | 23 | 49 | 1050 | 183 | 450 | ≥800 | 1.0 | 1.2 | 370 | 350 | 20 |
| | 6 | D | no | 25 | 38 | 37 | 1050 | 184 | 460 | ≥800 | 1.0 | 1.2 | 360 | 330 | 30 |
| | 7 | E | no | 24 | 35 | 41 | 1050 | 184 | 440 | ≥800 | 1.0 | 1.1 | 370 | 340 | 30 |
| | 8 | F | no | 15 | 33 | 52 | 1050 | 184 | 440 | ≥800 | 1.0 | 1.1 | 350 | 320 | 30 |
| | 9 | G | no | 30 | 25 | 45 | 1050 | 182 | 460 | ≥800 | 1.0 | 1.1 | 350 | 320 | 30 |
| | 10 | H | no | 11 | 15 | 74 | 1050 | 188 | 450 | ≥800 | 1.0 | 1.1 | 370 | 340 | 30 |
| | 11 | I | no | 2 | 10 | 88 | 1050 | 187 | 450 | ≥800 | 1.0 | 1.1 | 370 | 340 | 30 |
| | 12 | J | no | 8 | 34 | 58 | 1080 | 185 | 450 | ≥800 | 1.0 | 1.3 | 350 | 330 | 20 |
| | 13 | K | no | 9 | 38 | 53 | 1080 | 184 | 430 | ≥800 | 1.0 | 1.3 | 360 | 330 | 30 |
| | 14 | L | no | 12 | 28 | 60 | 1080 | 183 | 430 | ≥800 | 1.0 | 1.3 | 360 | 330 | 30 |
| | 15 | M | no | 5 | 42 | 53 | 1050 | 183 | 440 | ≥800 | 1.0 | 1.1 | 360 | 330 | 30 |
| Comparative Example | 21 | N | no | 80 | 17 | 3 | 1050 | 178 | 430 | ≥800 | 1.0 | 4.0 | 320 | 270 | 50 |
| | 22 | O | no | 67 | 20 | 13 | 1050 | 180 | 440 | 650 | 1.0 | 4.0 | 330 | 270 | 60 |
| | 23 | P | no | 98 | 1 | 1 | 1050 | 181 | 430 | 680 | 1.0 | 4.0 | 320 | 260 | 60 |
| | 24 | Q | no | 98 | 0 | 2 | 1050 | 184 | 440 | 650 | 1.0 | 4.0 | 300 | 220 | 80 |
| | 25 | R | no | 20 | 20 | 60 | 1050 | 183 | 440 | 680 | 1.0 | 3.0 | 330 | 270 | 60 |
| | 26 | S | yes | 6 | 45 | 49 | 1050 | 183 | 460 | ≥800 | 1.0 | 1.1 | 370 | 350 | 20 |

It is understood from Table 2 that in the examples of the invention, the composition of the oxide based inclusion is in the aforementioned range providing softness, and the bending workability and the fatigue resistance characteristics have small anisotropy, which are suitable characteristics for a metal gasket. In the observation of the L cross section of these test materials (cold rolled and annealed steel sheets), the oxide based inclusion was collapsed by rolling and extended in the rolling direction, and the maximum diameter thereof in the thickness direction was 2 μm or less. The examples of the invention also had good high temperature softening resistance characteristics.

In the comparative examples Nos. 21 to 24, on the other hand, the composition of the inclusion was outside the range providing softness, and the bending workability and the fatigue characteristics had large anisotropy. In No. 22, due to the low Mn content, the high temperature softening resistance characteristics were poor even though the N content was sufficiently ensured. In Nos. 23 and 24, the high temperature softening resistance characteristics of the steel sheets were poor due to the small N content in No. 23, and due to the small Mn content and the small N content in No. 24. In No. 25, the temper rolling reduction required for enhancing the strength was increased due to the small C content, and it was inferior in anisotropy. In No. 26, cracking occurred in the hot rolling due to the excessively high $\delta_{1230}$ value.

The experimental example for investigating the influence of the deoxidizing method on the composition of the inclusion will be described. As described above, in the steel making process of the steels of the invention shown in Table 1, the deoxidizing was performed by "Si deoxidizing". In the steel R as a comparative steel, "Si deoxidizing" was employed. A steel D-1 and a steel R-1 were manufactured by using "Al deoxidizing" to provide the same steel compositions as the steel D and the steel R (Si deoxidizing) in Table 1 respectively, and the composition of the inclusion therein was measured in the aforementioned manner. The results are shown in Table 3.

composition that contains from 0.030 to 0.300% of C, from 0.30 to 3.20% of Si, from 0.90 to 17.00% of Mn, from 1.00 to 8.00% of Ni, from 14.00 to 19.00% of Cr, from 0.50 to 3.50% of Cu, from 0.045 to 0.250% of N, from 0.0001 to 0.0300% of Al, from 0 to 0.50% of V, from 0 to 0.50% of Nb, from 0 to 0.30% of Ti, and from 0 to 0.010% of B, all in terms of percentage by mass, with the balance of Fe and unavoidable impurities, and has an $Md_{30}$ value defined by the following expression (1) of 50.0 or less and a $\delta_{1230}$ value defined by the following expression (2) of 8.0 or less, and having an average composition of an oxide based inclusion observed in a metal structure that contains 30% by mass or less of $Al_2O_3$, 60% by mass or less of $SiO_2$, and 15% by mass or more of MnO, in terms of converted mass ratio of $Al_2O_3$, $SiO_2$, and MnO, and satisfies the following expression (3), wherein a heating temperature at which the Vickers hardness of a plate surface of the cold rolled austenitic stainless steel after being subjected to a heat treatment of 120 hours falls to ⅔ of the Vickers hardness on a rolled surface of the sheet, Ho (HV), is at least 800° C.:

$$Md_{30}=551-462(C+N)-9.2Si-8.1Mn-29(Ni+Cu)-13.7Cr \quad (1)$$

$$\delta_{1230}=-101.5-78.6C+3.1Si+0.4Mn-2.4M+7.7Cr-1.5Cu-51.4N \quad (2)$$

$$MnO \geq -3SiO_2+110 \quad (3)$$

wherein in the expressions (1) and (2), the element symbols represent the percentages by mass of the elements respectively in the steel composition, and in the expression (3), MnO and $SiO_2$ represent the converted percentages by mass of MnO and $SiO_2$ respectively in the average composition of the oxide based inclusion.

2. The cold rolled austenitic stainless steel sheet according to claim 1, which has a Vickers hardness on the surface of the rolled sheet of from 400 to 460 HV.

3. The cold rolled austenitic stainless steel sheet according to claim 1, which has a thickness of from 0.05 to 0.5 mm.

TABLE 3

| | Chemical composition of steel (% by mass) | | | | | | | | Deoxidizing | Composition of oxide based inclusion (% by mass) | | |
|---|---|---|---|---|---|---|---|---|---|---|---|---|
| Steel | C | Si | Mn | Ni | Cr | N | Cu | Al | method | $Al_2O_3$ | $SiO_2$ | MnO |
| D | 0.086 | 2.67 | 1.52 | 5.41 | 15.08 | 0.098 | 2.05 | 0.003 | Si deoxidizing | 25 | 38 | 37 |
| D-1 | 0.085 | 2.70 | 1.53 | 5.40 | 15.10 | 0.097 | 2.00 | 0.004 | Al deoxidizing | 86 | 9 | 5 |
| R | 0.020 | 0.50 | 1.20 | 7.18 | 17.50 | 0.110 | 0.20 | 0.005 | Si deoxidizing | 20 | 20 | 60 |
| R-1 | 0.022 | 0.53 | 1.18 | 7.10 | 17.43 | 0.109 | 0.18 | 0.005 | Al deoxidizing | 70 | 20 | 10 |

As exemplified in Table 3, it is understood that even in the case where steels having the same steel composition are manufactured, the composition of the inclusion is largely fluctuated by the deoxidizing method. For providing the inclusion having a composition that is in the range providing softness, which is defined in the invention, Si deoxidizing is advantageous than Al deoxidizing.

The invention claimed is:

1. A cold rolled austenitic stainless steel sheet derived from a hot rolled austenitic stainless steel having a steel 4. The cold rolled austenitic stainless steel sheet according to claim 1, which has a Vickers hardness on the rolled surface of the sheet of from 400 to 460 HV, and a thickness of from 0.05 to 0.5 mm.

5. A metal gasket comprising the cold rolled steel sheet according to claim 1 having been formed, having a bead formed by press forming, and being used by pressing an apex of the bead onto a contact material.

6. A metal gasket comprising the cold rolled steel sheet according to claim 1 having been formed and then subjected to an aging treatment at from 100 to 500° C., having a bead formed by press forming, and being used by pressing an apex of the bead onto a contact material.

\* \* \* \* \*